US011907218B1

(12) United States Patent
Chakkappen et al.

(10) Patent No.: US 11,907,218 B1
(45) Date of Patent: Feb. 20, 2024

(54) AUTOMATIC PREVENTION OF PLAN REGRESSIONS

(71) Applicant: Oracle International Corporation, Redwood Shores, CA (US)

(72) Inventors: Sunil P. Chakkappen, Foster City, CA (US); Mohamed Ziauddin, Pleasanton, CA (US); Cetin Ozbutun, Atherton, CA (US); Palash Sharma, Belmont, CA (US); Yiqiong Zhang, Newark, CA (US); Zhan Li, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/886,804

(22) Filed: Aug. 12, 2022

(51) Int. Cl.
*G06F 16/2453* (2019.01)
*G06F 16/958* (2019.01)

(52) U.S. Cl.
CPC ...... *G06F 16/24542* (2019.01); *G06F 16/972* (2019.01)

(58) Field of Classification Search
CPC .................. G06F 16/24542; G06F 16/972
See application file for complete search history.

(56) References Cited

U.S. PATENT DOCUMENTS

| 2009/0100004 | A1* | 4/2009 | Andrei | G06F 16/2453 |
| 2009/0106306 | A1* | 4/2009 | Das | G06F 16/24545 |
| 2014/0236921 | A1* | 8/2014 | Belknap | G06F 16/24542 |
| | | | | 707/718 |
| 2016/0004621 | A1* | 1/2016 | Gongloor | G06F 11/3452 |
| | | | | 707/688 |
| 2017/0116253 | A1* | 4/2017 | Eadon | G06F 16/2453 |
| 2023/0024210 | A1* | 1/2023 | Won | G06F 16/217 |

* cited by examiner

*Primary Examiner* — Cam Y T Truong
(74) *Attorney, Agent, or Firm* — Hickman Becker Bingham Ledesma LLP

(57) ABSTRACT

Techniques for automatically preventing execution plan regressions are provided. In one technique, in a first user database session, in response to receiving a first database statement, a first execution plan is generated and, while executing the first execution plan, first performance data that indicates one or more first performance metrics of executing the first execution plan is recorded. In response to receiving a second database statement, where the first execution plan may be used to generate a result for the second database statement, a second execution plan is generated and second performance data that indicates one or more second performance metrics of executing the second execution plan is recorded. A comparison between the first performance data and the second performance data is performed. Based on the comparison, it is determined whether the second execution plan will be stored for future use to process a database statement.

20 Claims, 5 Drawing Sheets

AUTOMATIC PREVENTION OF PLAN REGRESSIONS

TECHNICAL FIELD

The present disclosure relates generally to database systems and, more particularly, to detection of, and responding to, plan regressions.

BACKGROUND

Processing queries typically comprise at least two phases—compilation and execution. During compilation of a database statement (e.g., DML, statements and queries), one or more database server processes perform many functions, such as parsing the database statement, determining what table(s), column(s), data type(s), etc., are involved, determining whether an index may be used, and generating an execution plan. In fact, during database statement compilation (or "query compilation" for short), a query optimizer generates multiple candidate execution plans. Execution plans include an access path for tables involved in the statement, join method between tables, the order in which joins should be performed, etc. The query optimizer selects the candidate execution plan with the lowest cost. The cost is computed based on an estimation of an amount of data processed, number of disk accesses, number of CPU cycles, etc. Usually, the lower cost execution plan performs better (fewer resources and/or less time, but not always since the cost is an estimate.

This process of compilation is typically referred to as a "hard parse." The execution plan and much information utilized during the compilation stage are saved in a structure referred to as a cursor. During execution, one or more database server processes use the cursor to execute the database statement. (Hereafter, "query" is used interchangeably with "database statement," even though query is a type of database statement.)

Occasionally, a query (that is issued against a database) is semantically equivalent to a previously issued query, meaning that an execution plan used to execute the previously issued query may be used to execute the current query and yield valid results. Such a newly issued query is referred to hereinafter as the "new query." A query that is issued previous to the new query is referred to hereinafter as a "previous query."

Because so much work is involved in compilation, it would be beneficial for the new query to share the cursor that was generated for the previous query. Therefore, once a query is compiled, its cursor may be shared for subsequently-issued queries that are (syntactically, or at least semantically) equivalent. Using an existing cursor for a new query is referred to as "cursor sharing," and the process of matching and picking up an existing cursor is referred to as "soft parse".

When a new query is issued to a database system that employs cursor sharing, a stored set of previously-generated cursors are searched to determine whether a previously-generated cursor can be used by the new query. Not only does cursor sharing avoid a hard parse each time an equivalent query is executed, cursor sharing may also reduce the amount of shared memory required to store the cursors.

However, repeatedly using the same cursor (including execution plan) each time the same or equivalent query is submitted may not be optimal. Changes to data that the query targets can trigger a degradation in performance of the execution plan. Thus, for example, the time to execute the execution plan, or the amount of volatile memory required to execute the execution plan, may substantially increase from the first execution to the second. Therefore, while there are benefits to cursor sharing, there may be significant costs that outweigh the benefits over time.

Furthermore, there may be other types of changes that may cause a different execution plan to be more optimal than an existing execution plan. Examples of such changes include new optimizer statistics (size of tables change, distribution of data within a column changes), the removal of statistics, changes in environment parameters, and software upgrades to the query optimizer.

On the other hand, even if a hard parse is performed every time a query is issued and a query optimizer generates a new plan for the query, there is no guarantee that the new plan is better than the old plan. Therefore, there is a need to intelligently generate new execution plans and detect plan regressions while benefiting from cursor sharing. A plan regression, in this context, is caused by a query optimizer choosing a sub-optimal plan when there exists a better plan. This can happen because the query optimizer selects a plan based on cost, which is an estimate. Based on new data, a query optimizer retrieves statistics for a new plan and may determine that a cost estimate for the new plan is lower than a cost estimate for an old plan, but still the old plan would have been better than the new plan in terms of actual cost (e.g., time, CPU utilization, and/or memory usage).

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

Figure 1:
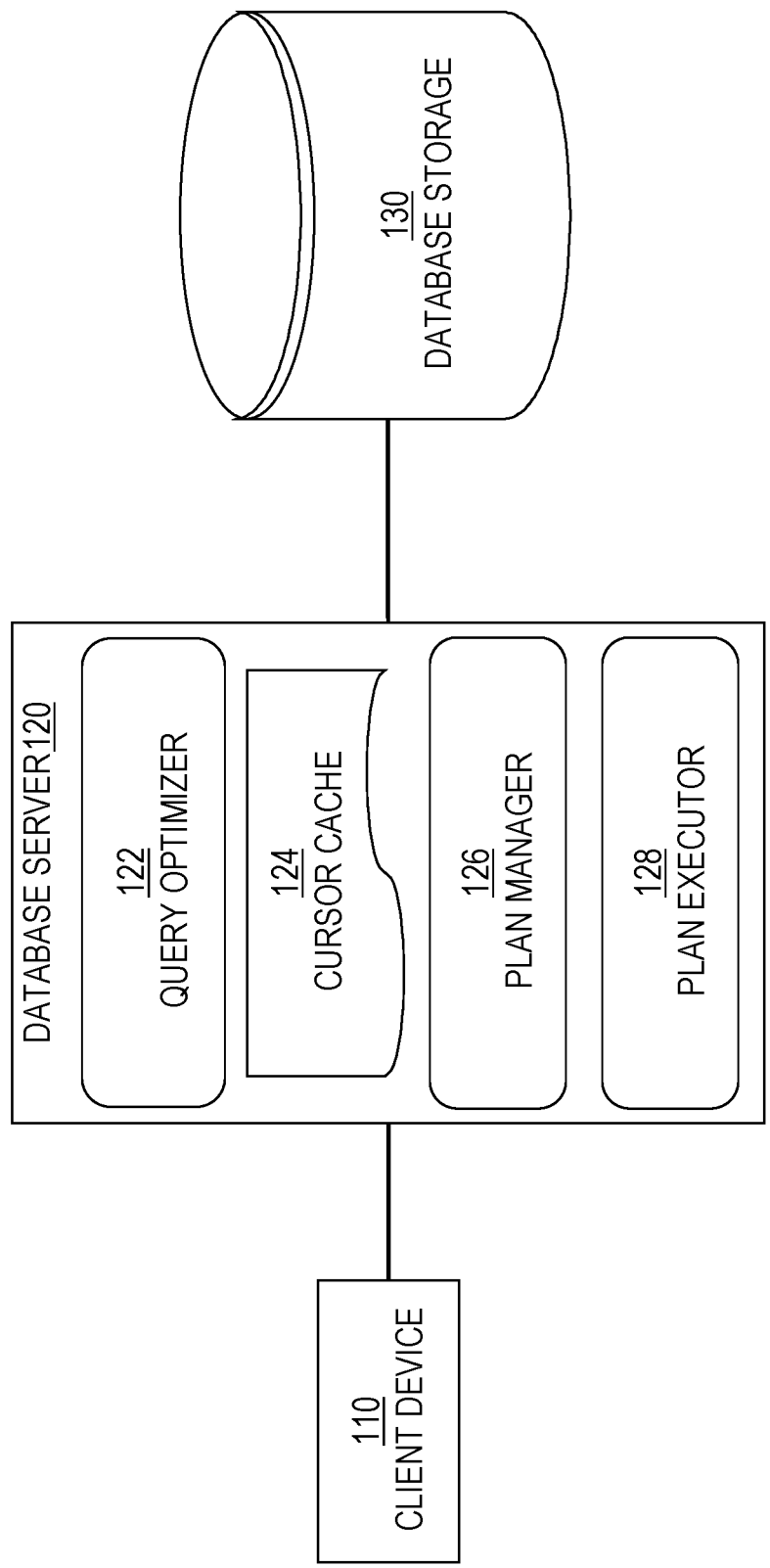
FIG. 1 is a block diagram that depicts an example system for detecting and resolving plan regressions, in an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Execution Plan Management

One approach to detecting whether an execution plan is suffering from degradation is to perform a hard parse of the corresponding query in the background (i.e., not in a foreground, user process), which involves generating multiple candidate execution plans (or using an execution plan seen in the past), estimating a cost of each candidate execution plan, and selecting the candidate execution plan with the least cost. Once selected, a background process executes the selected candidate execution plan and the current execution plan (if both plans are different) for the query. Performance metrics are gathered during execution of both plans and compared to each other. If, based on the comparison, the candidate execution plan performs better (e.g., fewer computer resources utilized, less time), then the candidate execution plan may replace the current execution plan in the corresponding cursor. (This means that the current execution plan may have experienced regression. Also, the new "better" plan is recorded for future use to avoid choosing the "bad" plan again during subsequent hard parses.) Otherwise, the current execution plan is retained.

This approach has numerous problems. First, detection of regression is asynchronous with foreground processes. The asynchronous nature of this approach contributes to the time delay in detection and resolution of regressions. For example, the time from executing a degraded execution plan until regression detection may be hours or days. By the time regression is detected and a new execution plan is generated, the old execution plan may have been executed in the database system many times, wasting database system resources and affecting database server performance.

Second, this approach involves a background process that runs with limited resources. Resources (such as CPU (central processing unit), DOP (degree of parallelism), time) are quite restricted for this approach in order to avoid interfering with user workload. The restricted resources increase the background processing time, thus adding more time windows between regression detection and regression resolution.

Third, this approach may fail to verify long running statements if the corresponding task runs with a time limit (e.g., 30 minutes). The time limit might not be enough time to verify performance of long running database statements, such as queries running for more than 30 minutes in the user environment. Such a task running with limited resources amplifies this problem as execution plan verification is done with limited resources and has more chances of not finishing in the, for example, 30-minute window. Thus, plan verification will fail for these long running database statements.

Fourth, this approach may fail to accurately reproduce execution plans seen in the past. The regression detection task attempts to reproduce an execution plan seen in the past and then executes the execution plan to verify the performance. Because the regression detection task runs in the background, this task may fail to exactly replicate the user environment in which the original execution plan was generated. This failure might be due to some environment settings that are applied in the user environment but not in the background task environment. Thus, for example, an old plan may perform better than a new plan in the background when the new plan would have performed better if both were executed in the foreground. In this example, the new (better) plan would not be selected.

Fifth, this approach may result in errors during verification of plan performance. Specifically, some database statements may use bind variables and there may be limit on the size of bind variables (e.g., 400 bytes) that can be captured as part of an execution plan. When bind variables are missing due to the limit, then a query parser assumes a character type, which causes data type conversion issues, which results in errors when trying to process the database statement for verifying the performance. Thus, execution plan evolution will fail in such circumstances.

Sixth, this approach may suffer from a mismatch in the security contexts of the foreground and background processes. When a user issues a database statement, the database statement may be executed with some specific security context/policies. For example, filter predicates generated based on a security policy may limit the rows that are selected from some tables when executed by certain users. When such database statements are run by a background process, these security context/policies might not be available since the database statement is not run in the same user environment as the original execution plan. Such a mismatch can potentially cause incorrect performance comparison since regression detection and plan verification is occurring without the additional security predicates.

General Overview

A system and method for automatically detecting and responding to plan regressions are provided. Whenever there is a change to an execution plan, a goal is to detect that change as soon as possible and compare performance of a new execution plan with performance of the old execution plan. In one technique, after execution of a first execution plan for a first database statement where performance metrics are tracked, a second database statement is received, which may or may not be identical to the first database statement. A query optimizer determines to compile the second database statement and generate a second execution plan, even though the first execution plan could be used to process the second database statement. The second execution plan is executed in the same user session as its compilation and used to generate a result for the second database statement. Thus, the second execution plan is executed in the foreground, or in a user session, as well as the tracking of performance metrics.

The performance metrics of the execution of the respective execution plans are compared to determine whether to accept the new (second) execution plan.

Embodiments improve computer technology by avoiding many of the disadvantages of the background approach. Also, if a new execution plan represents a regression relative to an old execution plan, then the new execution plan is only executed once and, therefore, there is only a one-time penalty. If the new execution plan represents positive plan evolution, then the benefits of the new execution plan are realized immediately without delay. Such a new execution plan is now considered performance verified and accepted and can be used in subsequent executions.

System Overview

FIG. 1 is a block diagram that depicts an example system 100 for detecting and resolving plan regressions, in an embodiment. System 100 includes a client device 110 and a database system, which comprises a database server 120 and a database 130.

Client device 110 is communicatively coupled to database server 120, either via a local network, a wide area network (WAN), or the Internet. Although only a single client device is depicted, system 100 may include many client devices that are communicatively coupled to database server 120. Client device 110 hosts a database client that generates and submits client requests to database server 120. Client requests includes requests to read data stored in database 130 and requests to update data stored in database 130, such as deleting, inserting, and updating (i.e., replacing an existing value with a new value), which may be treated as a deletion followed by an insertion. Client device 110 receives, from database server 120, responses to the client requests. Data from responses may be presented on a screen of client device 110 and/or may be stored on client device 110 and/or another storage device that is accessible to client device 110.

Database server 120 comprises a query optimizer 122, a cursor cache 124, plan manager 126, and a plan executor 128. Query optimizer 122, plan manager 126, and plan executor 128 may be implemented in hardware, software, or any combination of hardware and software. While query optimizer 122, plan manager 126, and plan executor 128 are depicted as separate components of database server 120, the functions described for all may be performed by a single component or may be performed by more or less components. Thus, the distribution of functions that each component performs may be implemented differently than what is described herein.

Cursor cache 124 is part of volatile memory and includes zero or more cursors, each containing an execution plan that was generated for a database statement. Two or more cursors in cursor cache 124 may include different execution plans for the same (or equivalent) database statement. A cursor may be automatically removed from cursor cache 124 for one or more reasons. For example, a cursor may be removed when there is a memory pressure or the cursor cannot be used anymore. When there is a memory pressure, one or more least recently used cursors can be aged out. When there is modification (such as dropping a table) to an object in a database statement, the corresponding cursor cannot be used anymore and can be invalidated or removed.

Query optimizer 122 receives a database statement (which may be issued by client device 110) and processes the database statement, resulting in the generation of one or more candidate execution plans and computes the cost of each candidate execution plan. An execution plan includes the access path for tables involved in the corresponding statement, a join method between tables, an order in which the joins should be performed, etc. Then query optimizer 122 selects the candidate execution plan with the lowest cost. The cost may be computed based on an estimation of an amount of data to be processed, a number of disk accesses, a number of CPU cycles, etc. Typically the lowest cost execution plan performs best (in terms of fewer resources and/or less time), but not always since the cost is an estimate.

In an embodiment, prior to generating one or more execution plans, query optimizer 122 determines whether there exists, in cursor cache 124, an execution plan that may be used for the database statement. The execution plan may have been generated for the exact database statement issued in the past. If the exact database statement was not issued in the past, the execution plan may still be used for the current database statement. For example, the current database statement may have the same joins and predicates as a previous one, but also has one or more constants that are different from one or more constants in the previous database statement. If such an execution plan exists in cursor cache 124, query optimizer 122 may determine to select that execution plan for execution instead of generating one or more candidate execution plans.

Such a determination may depend on the satisfying of one or more compilation criteria, which dictates whether to compile the database statement (i.e., perform a hard parse) or to select an appropriate execution plan. Examples of compilation criteria include whether one or more data sets that the database statement targets have changed in size by a certain percentage (e.g., +/−20%), whether a new version of query optimizer 122 or plan executor 128 is being executed/run relative to the version that generated or processed an existing/available execution plan, or whether a security policy is different. If one or more compilation criteria are satisfied, then query optimizer 122 generates a cost of different candidate execution plans even though one may be available in cursor cache 124.

A cursor (and its associated execution plan) is associated with metadata that indicates whether its execution plan has been accepted and/or verified. A verified execution plan is one that was just executed and whose performance metrics have been compared with another eligible execution plan for the same (or equivalent) database statement (i.e., a database statement that can be processed using the same execution plan). An accepted execution plan is one that has been verified and that has better performance metrics than another execution plan for the same (or equivalent) database statement. Thus, an execution plan may have been verified, but not accepted. Also, the first ever generated execution plan for a database statement cannot be verified until its performance is compared to the performance of the second generated execution plan for the database statement.

Plan manager 126 determines whether an optimizer-selected plan (OSP) is a test plan or not a test plan. A test plan is an execution plan whose performance is compared to the performance of a reference plan. Performance tracking may be performed for all database statements. Database statements, their plans, and their performance metrics may be monitored and persistently stored in database storage 130. Examples of performance metrics are CPU time, elapsed time, buffer gets (i.e., buffered I/O), disk reads (i.e., physical disk I/O), and temporary space usage. In an embodiment, only CPU time and buffer gets are used to compare performance because these metrics are not sensitive to any concurrent activity happening in the database system.

A reference plan is an execution plan that has been executed for a database statement in the past. The performance of the reference plan will be compared to the performance of a test plan. A reference plan may have been accepted and verified, verified and not accepted, or not yet verified.

Plan executor 128 executes an OSP. Plan executor 128 tracks one or more statistics while executing an OSP (i.e., in the same user database session as execution of the OSP), such as a start timestamp indicating a time (e.g., clock time or system time) when plan executor 128 began executing the OSP, an end timestamp indicating a time when plan executor 128 completed executing the OSP, a total amount of CPU for executing the OSP, a total number of logical I/O requests, a number of physical I/O requests, a size of data read from non-volatile storage into volatile storage, and a number of network I/O requests.

Database storage 130 is persistent storage device and stores one or more data sets. Examples of data sets include tables, table columns, arrays of values, and linked lists. Database storage 130 persistently stores metadata about these database objects, as well as statements, plans, and performance metrics.

Process Overview

Figure 2:
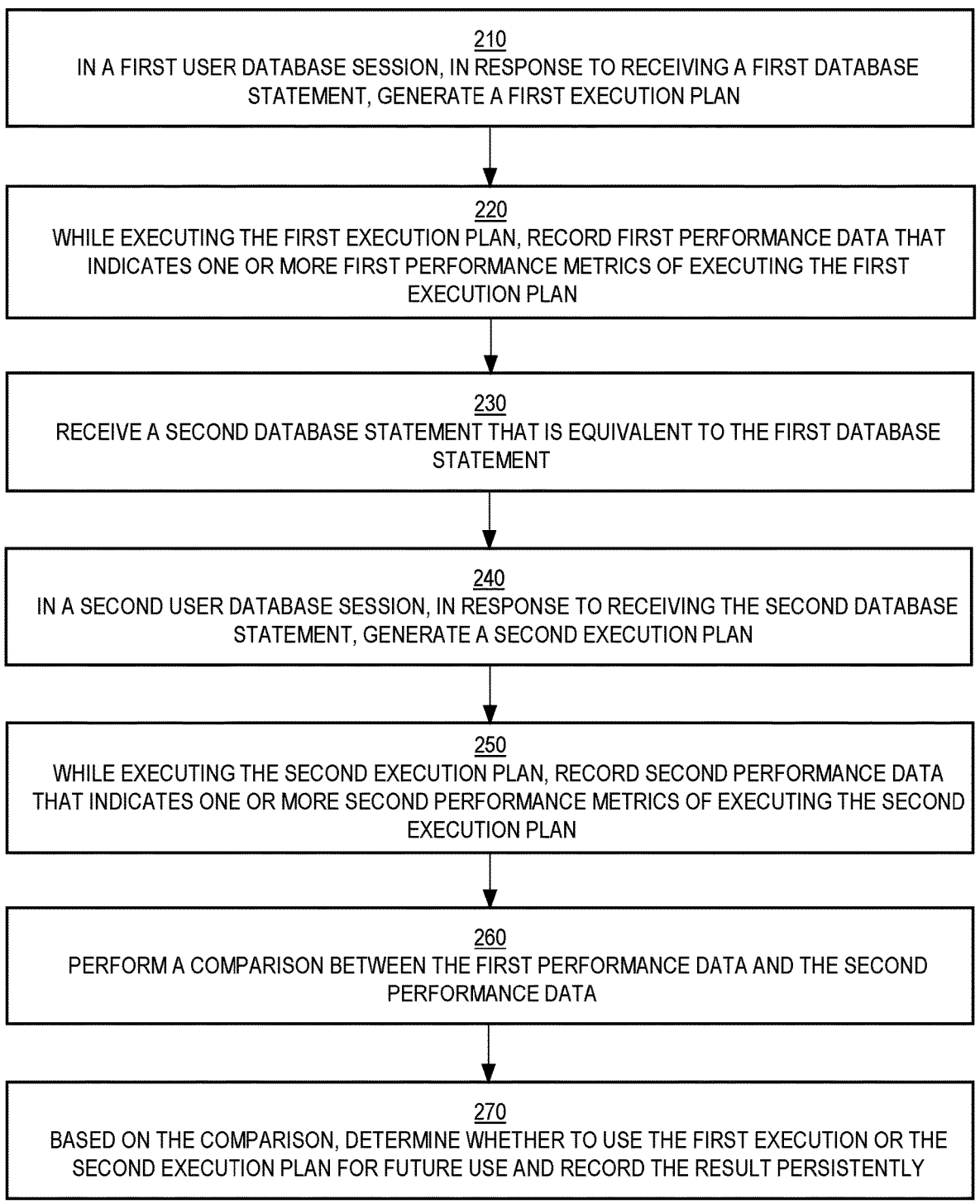
FIG. 2 is a flow diagram that depicts an example process for performing plan management in the foreground, in an embodiment.

FIG. 2 is a flow diagram that depicts an example process 200 for performing plan management in the foreground, in an embodiment. Process 200 is performed by various components of database server 120.

At block 210, in a first user database session, in response to receiving a first database statement, a first execution plan is generated. Block 210 may involve query optimizer 122 determining that no execution plan exists for the first database statement. This means that the first database statement has not yet been submitted previously to database server 120. The "user" in first user database session may be an individual end user or an application that is submitting the first database statement.

At block 220, while executing the first execution plan, first performance data that indicates one or more first performance metrics of executing the first execution plan for the first database statement is recorded. Block 220 may be performed by plan executor 128, but in the same user database session as block 210.

At block 230, a second database statement is received. Block 230 is performed by database server 120 and, more specifically, by query optimizer 122. The first execution plan may be used to generate a result for the second database statement.

At block 240, in the same or different user database session, in response to receiving the second database statement, a second execution plan is generated. Block 240 may involve query optimizer 122 determining that one or more candidate execution plans should be generated, even though the first execution plan may be used to process the second database statement. If the user database session in block 240 is a different user database session, it may be for the same user as the user of the first user database session or may be for a different user than the user of the first user database session.

At block 250, while executing the second execution plan, second performance data that indicates one or more second performance metrics of executing the second execution plan for the second database statement is recorded. Block 250 may be performed by plan executor 128, but in the same user database session as block 240.

At block 260, a comparison between the first performance data and the second performance data is performed. For example, the first performance data may indicate that 19 seconds elapsed while executing the first execution plan and the second performance data indicates that 32 seconds elapsed while executing the second execution plan. Block 260 may or may not be performed in the second user database session.

At block 270, based on the comparison, it is determined whether to store the second execution plan for future use when processing the second database statement or an equivalent statement. If the second performance data is better than the first performance data, then the second execution plan is stored for future use. This storing may involve storing acceptance data that identifies the second execution plan as a verified and accepted plan, at least because the second execution plan performs better (based on one or more performance metrics) relative to the first execution plan. An "accepted plan" is an execution plan that has gone through the verification process (of comparing the execution plan with another execution plan for the same database statement) and the execution plan performed better than the other execution plan.

If the first performance data is better than the second performance data, then the second execution plan might not be stored for future use. This storing may involve storing verified data that identifies the second execution plan as verified but not accepted, at least because the second execution plan does not perform better (based on one or more performance metrics) relative to the first execution plan. If a difference between the first performance data and the second performance data is less than a threshold, then the second execution plan may be classified as verified so that its performance is not repeatedly verified.

Test Plan Detection

Determining whether an optimizer-selected plan (OSP) is a test plan or not dictates how the OSP is processed. If an OSP is a test plan, then the OSP is executed and certain statistics are tracked (e.g., time elapsed while executing the OSP; number of buffer gets) so that a performance comparison may be made with a reference plan. If an OSP is not a test plan, then how the OSP is processed (e.g., ignored or executed) depends on whether the OSP matches an accepted plan, whether the OSP matches a verified plan, and, possibly, whether there exists another plan (e.g., an accepted plan) for the same database statement. For example, if the OSP matches an accepted plan, then the OSP is executed. If the OSP does not match an accepted plan, but does match a verified plan, then another plan that is associated with the same database statement is chosen (by costing available accepted plans and selected the least cost plan) and then executed.

Figure 3:
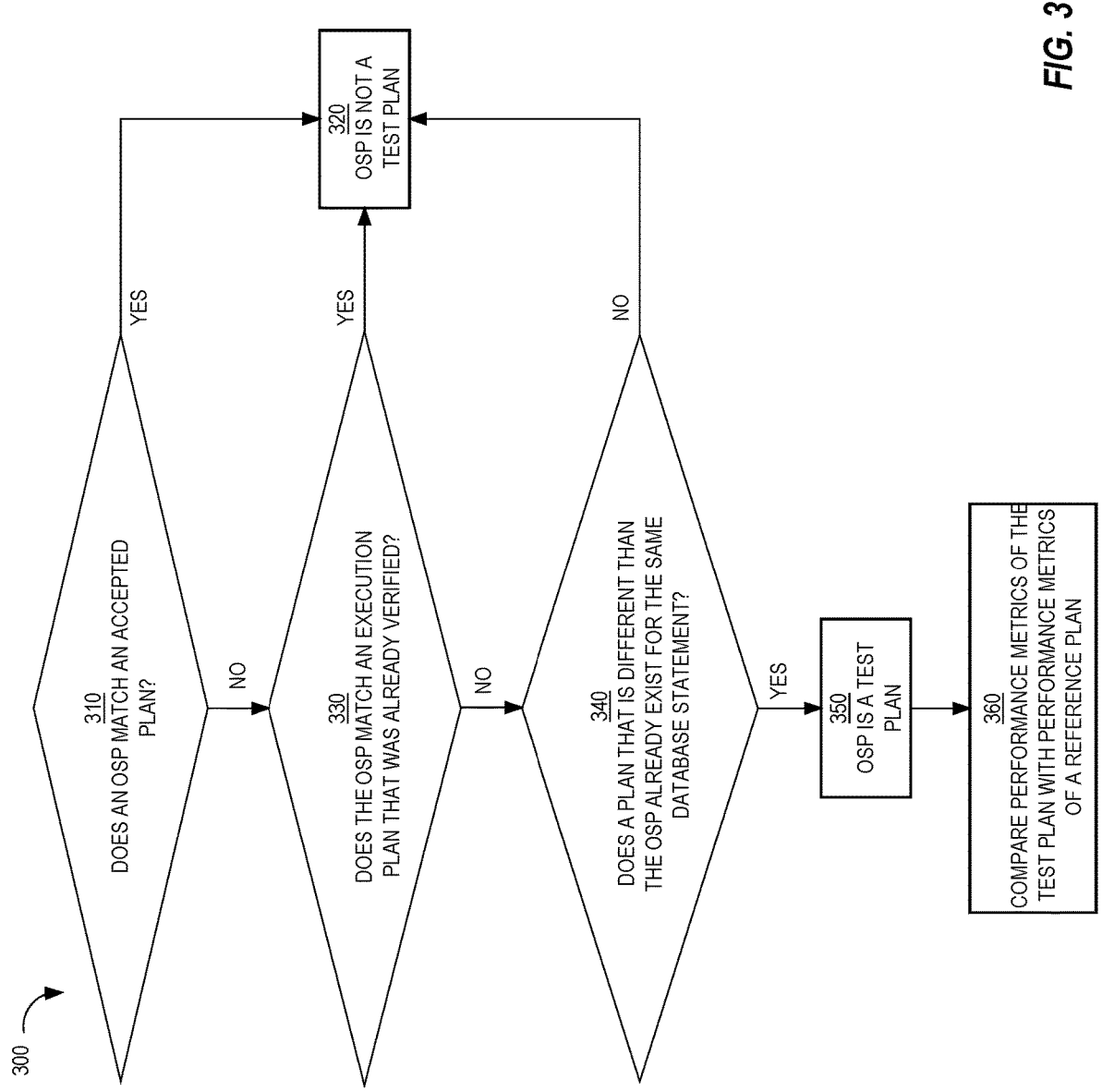
FIG. 3 is a flow diagram that depicts an example process for determining whether an execution plan is a test plan, in an embodiment.

FIG. 3 is a flow diagram that depicts an example process 300 for determining whether an execution plan is a test plan, in an embodiment. Process 300 may be performed by plan manager 126.

At block 310, it is determined whether an OSP matches an accepted plan. Block 310 may be performed by comparing each operation in the OSP with a corresponding operation in an accepted plan for the same (or equivalent) database statement. Alternatively, block 310 may involve comparing a hash ID of the OSP with a hash ID of an accepted plan, where a hash ID is generated based on nodes of the corresponding execution plan. A database statement may be associated with multiple accepted plans.

If the determination in block 310 is in the affirmative, then process 300 proceeds to block 320 where the OSP is not treated as a test plan. Instead, the OSP is executed regularly without having to compare its performance with the performance of any other plan. In fact, no performance statistics need to be tracked while executing the OSP though such statistics may still be tracked for comparing the performance of this plan with a future test plan. If the determination in block 310 is in the negative, then process 300 proceeds to block 330.

At block 330, it is determined whether the OSP matches an execution plan that was already verified (e.g., in the foreground). If so, then this means that the matching execution plan was a test plan in the past but did not perform better than another execution plan. If the determination in block 330 is in the affirmative, then process proceeds to block 320 where the OSP is not treated as a test plan. Instead, a least cost (previously-generated) accepted plan (if one exists) is used to process a current database statement. Or, if no accepted plan exists, then the OSP is executed. If the determination in block 330 is in the negative, then process 300 proceeds to block 340.

At block 340, it is determined whether a different plan than the OSP exists in cursor cache 124 (or in persistent storage, such as database storage 130) for the current database statement. If the determination in block 340 is negative, then process proceeds to block 320 where the OSP is not treated as a test plan. A negative determination means that the OSP might be a new execution plan for the database statement. If the determination in block 340 is negative, then the OSP is executed regularly without having to compare its performance with the performance of any other plan. In fact, no performance statistics need to be tracked while executing the OSP, though such statistics or execution metrics may still be captured for comparing its performance with a future test plan. If the determination in block 340 is positive, then that means a different plan than the OSP exists and process 300 proceeds to block 350.

At block 350, the OSP is treated as a test plan, which means that plan executor 128 processes (or executes) the OSP and tracks performance statistics while producing a result for the corresponding database statement.

At block 360 one or more performance metrics (based on the statistics) of the test plan are compared to one or more performance metrics of a reference plan and a determination is made regarding which plan performed better. If the test plan performed better than the reference plan, then plan executor 128 (or plan manager 126) marks the test plan as an accepted plan and may mark the reference plan (which may have previously been marked as accepted) as a verified plan if it was not already verified. A reference plan that is marked as accepted may or may not have been verified. This is possible if an option is provided to a user to load an existing execution plan as an accepted plan, which may or may not have been verified in the past. Also, if an execution plan existed (including being executed) before this test plan feature was enabled, then such an execution plan may be considered an accepted plan that has not yet been verified. In summary, the following four combinations of statuses of an execution plan are possible: (1) verified and accepted, (2) verified and non-accepted, (3) non-verified and accepted, and (4) non-verified and non-accepted.

As an example, plan P1 is not yet verified because it is the first plan for a database statement. Plan P1 is not considered a test plan because there is no other plan to compare against plan P1. After plan P1 is executed, a query optimizer generates another plan P2. At this point, plan P2 is considered a test plan and plan P1 is considered a reference plan. If the performance of plan P2 is worse than the performance of plan P1, then plan P1 becomes an accepted plan, while plan P2 does not become accepted. At this point, plan P2 is marked as verified, but not P1. Thus, in this example, plan P1 is accepted but not verified, while plan P2 is not accepted but verified.

"Marking" an execution plan involves updating a status of the execution plan. The status is metadata of the execution plan. An execution plan may be associated with a single status or multiple statuses. For example, an execution plan may be associated with an accepted status (e.g., True or False) and with a verified status (e.g., True or False). As another example, an execution plan has a single status that is assigned one or more alphanumeric characters that indicate the status, such as "A" for accepted and verified, or "B" for accepted and not verified, "C" for verified but not accepted, "D" for neither verified nor accepted.

Efficiently Matching Plans

Because plan regression detection is determined in a user session, efficiently detecting whether an execution plan is a test plan is important in order to reduce the number of computer resources dedicated to making this decision. Such detection involves matching an optimizer-selected plan (OSP) with an existing execution plan. One way to determine whether an optimizer-selected plan (OSP) matches an existing execution plan is, first, comparing text of an incoming database statement with text of previously-received database statements until a matching database statement is located, and then, second, comparing an OSP of the incoming database statement with each plan that is associated with the matched database statement. Comparing execution plans may involve comparing a first operation in an access path of the OSP with a first operation in an access path of the candidate execution plan and repeating this for each operation in the respective access paths until a non-match is detected (in which case it is determined that the plans do not match) or until all plan operations are considered (in which case it is determined that the plans match). In database systems where there are hundreds or thousands of database statements and corresponding execution plans, such a sequential search may take a significant amount of time and computer resources.

In an embodiment, each database statement is associated with a statement identifier (ID). A statement ID may be constructed by computing a hash value based on the (e.g., SQL) text of the database statement. Specifically, the statement ID may be computed based on properties of text of the corresponding database statement, such as data sets (e.g., tables) referenced in a FROM clause, data sets (e.g., columns) referenced in the SELECT clause, and one or more predicates referenced in the WHERE clause (if any).

Similarly, each execution plan is identified by a plan ID and may be computed based on nodes in the corresponding execution plan. Examples of nodes include filter nodes, column scan nodes, and index nodes. The resulting plan ID may be a hash value.

In an embodiment, three bit vectors are generated: a plan baseline bit vector, a multi-plans bit vector, and a plan existence bit vector. If a database statement has at least one plan baseline (whether it has the status of "accepted" or "not accepted"), then a bit is set (based on statement ID) in the plan baseline bit vector. Thus, a single bit vector includes information for potentially many database statements. Also, there may be many bits in the plan baseline bit vector that do not correspond to any database statement and, therefore, those bits would never be set.

A bit in the multi-plans bit vector is set if there is more than one execution plan for the same database statement. This bit is set based on the statement ID.

A bit in the plan existence bit vector is set corresponding to a combination of a plan ID and a statement ID. Thus, a combination of the statement ID and plan ID (or hash value) maps to a bit in the plan existence bit vector.

An example of how the multi-plans and plan existence bit vectors may be used is as follows. A query optimizer generates a plan P1 for statement S1 and plan P1 is not verified yet. It is then determined whether a corresponding bit (corresponding to statement S1) is set in the multi-plans bit vector. If so, then this implies that more than one plan has been generated for statement S1 in the past and P1 can be compared against one of those plans. Therefore, plan P1 can be executed and verified immediately after the verification.

If a corresponding bit is not set in the multi-plans bit vector, then this implies that there is at most one plan seen in the past for statement S1. In this case, it is determined whether a bit corresponding to plan P1 is set in plan existence bit vector. If so, then that means plan P1 has been seen before and there exists only one plan for statement S1 (since the bit in multi-plans bit vector is not set for statement S1). In this case, plan P1 does not need to be verified now because plan P1 has been seen in the past.

However, if a bit in plan existence bit vector is not set for plan P1, then this may mean that a different plan has been seen in the past and needs to be verified. For example, a bit for another plan P2 for S1 might already be set in the past in plan existence bit vector and plan P1 is a brand new plan that the query optimizer just generated. In this example, plan P1 is verified against plan P2. At this point, a bit in multi-plans bit vector for statement S1 will be set (since more than one plan for statement S1 has been generated). If there were no plans for statement S1, then a bit for plan P1 will not be set in the plan existence bit vector and, accordingly, plan P1 will be executed and verified. However, at a later stage, any other plan that can be compared against plan P1 will not be found and, therefore, no verification will take place. At this point, a bit for plan P1 will be set in the plan existence bit vector. Subsequent generation of plan P1 for statement S1 will not do the unnecessary verification step.

Reverse Verification

In order to make a determination that a test plan performs worse than a reference plan, plan executor 128 (or another component of database server 120) compares the current performance of the test plan with the performance of the reference plan, which may have been executed in the distant past. In the meantime, the data upon which the test and reference plans operate may have changed significantly. Thus, one reason that a reference plan would have performed better than a test plan is because the reference plan that executed in the past may have operated on data that has changed significantly since then. Another reason that a reference plan would have performed better is the change in query constants (e.g., bind variables) that prompt the optimizer to not share but build a new execution plan. The new constants may represent selection of much larger data than old ones, thus making the new execution plan (even though it is optimal) perform worse than the old execution plan.

Therefore, in an embodiment, a reference plan that is determined to be better than a test plan is executed the next time a database statement (that can leverage the reference plan) arrives. This execution of the reference plan occurs even though the optimizer generates the test plan again. Thus, the reference plan becomes a "new" test plan. One or more performance metrics of executing the "old" reference plan (i.e., the new test plan) are then compared to the performance metrics of the "old" (or previous) test plan.

In summary, this process is as follows: (1) a query optimizer generates a test plan; (2) the test plan is executed; (3) performance of the test plan is compared with performance of a reference plan; (4) it is determined that the reference plan performed better based on the comparison; (5) the query optimizer generates the test plan again; (6) the reference plan is executed (instead of the test plan) as a test plan; (7) performance of this reference plan (the new test plan) is compared with the performance of the "old" test plan.

The query optimizer generates the test plan again (step 5) as a result of a hard parse. A hard parse occurs either because no cursor was found or a cursor was found but the cursor does not satisfy certain matching criteria. Upon the hard parse, the query optimizer builds an execution plan that is same as the test plan that the query optimizer previously built. However, that previous test plan was not accepted; therefore, it cannot be used. However, the reference plan was accepted. If the reference plan was never verified (because a verified plan is one that was just executed and tested), then the reference plan becomes a candidate for verification now with the "old" test plan serving as a reference plan.

This process of using an old reference plan as a new test plan and comparing its current performance metrics with performance metrics of the old test plan is referred to as "reverse verification." Reverse verification gives the old test plan one more chance to be accepted in case the performance metric(s) of the old reference plan was/were captured a long time ago, with a significantly different data set, with different system parameters, and/or with different bind variables.

For example, a query optimizer correctly selects a new plan due to higher data volume. However, such a selection appears to cause regression compared to an old plan executed with lower data volume. In such a scenario, the old plan is accepted (if it is not already accepted), but such acceptance will be a wrong decision because the old plan with higher data volume could have performed worse than the new plan. This situation is addressed by doing reverse verification.

Performance Comparison

A performance comparison between a test plan and a reference plan may be performed in any number of ways. Embodiments are not limited to any particular way. One example performance comparison is computing an improvement in one or more performance metrics, such as CPU usage and number of buffer gets (BGs). A BG is a logical I/O request. A logical I/O request checks volatile (or cache) memory for target data while a physical I/O request checks non-volatile storage (such as disk storage) for target data, which storage has longer latency than volatile memory. In one implementation, plan executor 128 always issues logical I/O requests, which means volatile memory is checked first. If one or more tiers of cache do not have the target data, then a physical I/O request is issued.

CPU improvement ("improveCPU") may be determined by computing a ratio ("refCPU/testCPU") of the CPU usage of the reference plan ("refCPU") to the CPU usage of the test plan ("testCPU"). If the number of the latter is smaller than the former, then the result of the ratio is greater than one. Similarly, BG improvement ("improveBG") may be determined by computing a ratio ("refBG/testBG") of the number of BGs of the reference plan ("refBG") to the number of BGs of the test plan ("testBG"). Regression of a performance metric may be then determined by computing the inverse of the improvement of the performance metric (e.g., "1/improveCPU" for CPU regression and "1/improveBG" for BG regression).

With such improvements and/or regressions computed, one or more evaluations are performed. For example, if CPU improvement is greater than 1.5 and CPU improvement is greater than BG regression, then the test plan is better. Also, if BG improvement is greater than 1.5 and BG improvement is greater than CPU regression, then the test plan is better. However, if CPU regression is greater than 1.5 and CPU regression is greater than BG improvement, then the reference plan is better. Also, if GP regression is greater than 1.5 and GP regression is greater than CPU improvement, then the reference plan is better. If none of these conditions are true, then the two plans are considered similar.

In the above example, the checks to determine which plan is better are symmetric. In other words, the checks for determining whether the test plan is better than the reference plan are the same as the checks for determining whether the reference plan is better than the test plan. In other examples, the checks do not have to be symmetric. However, because a test plan can become a reference plan in the future, implementing symmetric checks has merit.

In the above example, if a first metric is improving a significant amount and but a second metric is regressing more than the first metric improvement, then the test plan is treated as a regression. For example, if the CPU of a test plan improved by two times and BGs regressed by three times, then the test plan is considered worse than the reference plan. If multiple metrics for a test plan improved and one of the metrics improved more than 1.5 times, then the test plan is considered better. In a related example, if the absolute difference in a performance metric is less than a threshold (e.g., 100 ms as it pertains to CPU time), then the test plan and the reference plan are considered similar. In such a scenario, the test plan may be considered a verified plan but not an accepted plan.

Invalidation of Cursors

Cursor invalidation refers to removing a cursor from cursor cache 124 so that that cursor (and corresponding execution plan) is not selected in the future for a database statement. Cursor invalidation may occur when restarting a computing system, such as restarting database server 120. Cursor invalidation may also be performed in response to major changes, such as a system parameter change and changes in table sizes referenced in the cursor.

In an embodiment, a test plan is invalidated if the test plan performs worse than a corresponding reference plan. This ensures that future execution of the test plan is avoided. A goal is to limit the number of executions of "bad" (or poor performing) plans. If a new plan is generated and the new plan is the same as the test plan that was invalidated (e.g., the new plan has the same plan hash value as the test plan), then it will be determined that the test plan was already verified and, therefore, the new plan will not be processed as a test plan. Instead, the query optimizer will use the least cost accepted plan. In a related embodiment, an execution plan can be a test plan only once. Once a test plan is executed and its performance metrics are compared to those of a reference plan, the test plan is marked as verified. A basic criterion for an execution plan to be a test plan is that the test plan has not gone through performance verification.

Resource Limit for Database Statements

In an embodiment, a database statement is associated with a resource limit. The resource limit is used to determine whether processing a database statement (including executing an execution plan for the database statement) has utilized too many resources of one or more types. If processing a database statement exceeds a specified resource limit, then database server 120 (or plan executor 128, specifically) automatically interrupts the processing and releases all computer resources "held" (or used by) the database statement. A purpose of implementing a resource limit is to avoid runaway statements that are consuming an excessive amount of system resources. Examples of resources that may have associated limits include time elapsed, CPU usage, memory usage, number of logical I/O requests, and number of physical I/O requests.

A resource limit (e.g., a time limit) may be a default resource limit (e.g., 30 minutes) or may be specified by a user. For example, database server 120 allows users (e.g., a user of client device 110) to specify a resource limit for a particular database statement or any database statement submitted by the user, another user, and/or a specified group of users. Also, database server 120 may store a default resource limit that is applicable to all database statements that database server 120 processes except for database statements that are associated with a user-specified resource limit.

In an embodiment, during execution of a test plan that is interrupted as a result of exceeding a resource limit, performance metrics are tracked, such as the number of buffer gets and CPU usage. The performance metrics of an interrupted test plan are compared to performance metrics of a reference plan. If the test plan performance at the point of interrupt is worse than the reference plan performance, then the test plan is marked as worse, resulting in avoiding subsequent executions of the test plan. However, if the test plan performance is better, the test plan is not marked as better. Instead, the test plan is marked as similar because the test plan was interrupted and, thus, it is not known what the actual performance of the test plan would be.

In an embodiment, a resource limit that is to be applied to a test plan is automatically computed based on one or more performance metrics (e.g., CPU usage, number of buffer gets, elapsed time) of a corresponding reference plan. Such an automatic computation of a resource limit may be performed if a user does not specify a resource limit that is applied to the test plan. For example, a time limit for a test plan is the maximum of (i) thirty minutes and (ii) ten times the elapsed time of a corresponding reference plan. Such an automatically computed resource limit is more dynamic and statement specific and, therefore, may work better compared to a system-wide user-specified resource limit that has to be the maximum time that any statement can take in a database system.

In some applications, interrupting and raising an error for a database statement is not desirable if the applications are not expecting (or cannot handle) such errors. Nevertheless, in an embodiment, database server 120 computes a resource limit for a database statement automatically and, if it exceeds it, the information is logged in the system at the end of executing the test plan without interrupting the statement. If a test plan is consuming, for example, ten times of the resources of a reference plan, then this information may be a potential issue in query optimizer 122 decisions. The logged information may be used for detecting and diagnosing these kind of optimizer issues.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 4:
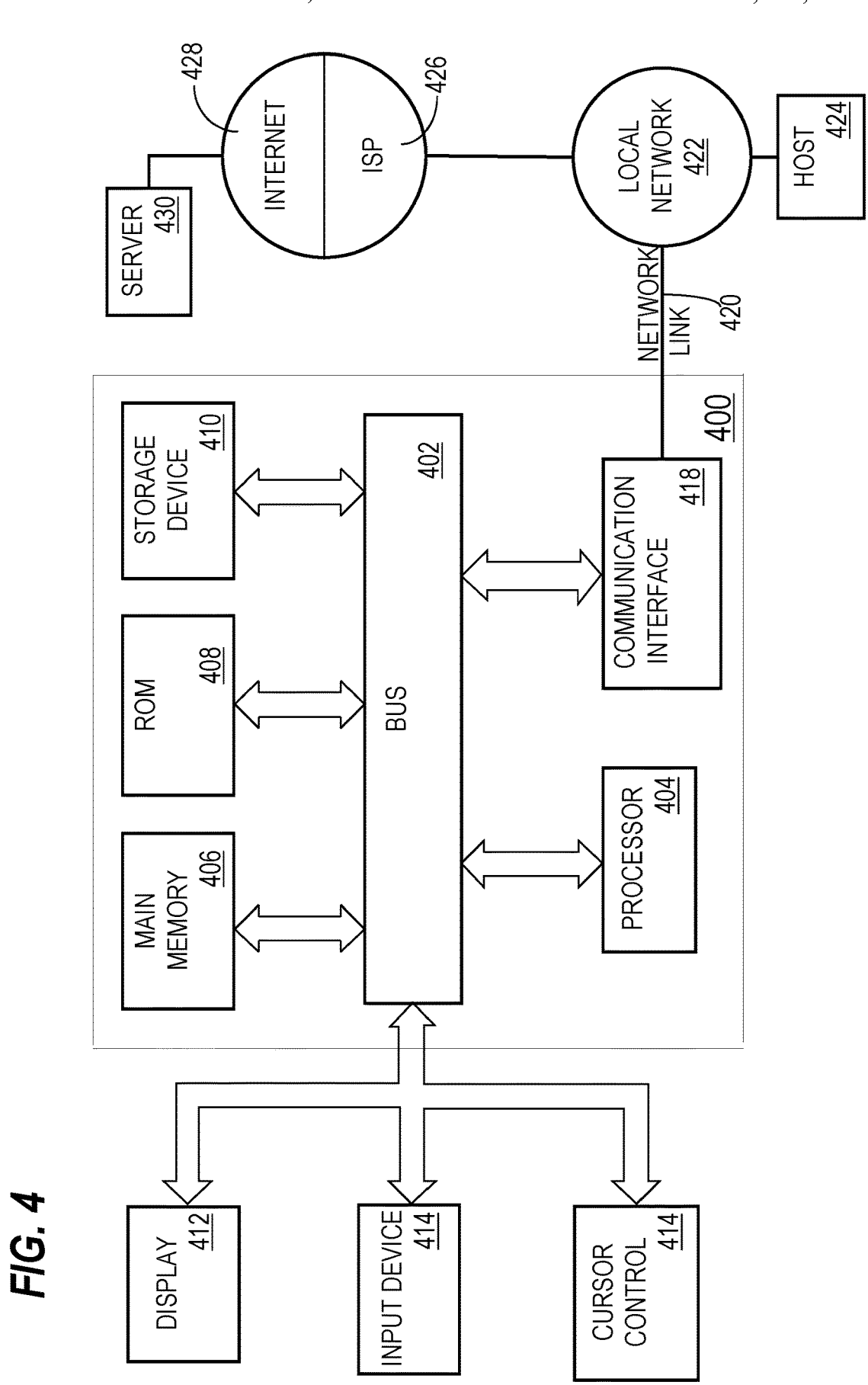
FIG. 4 is a block diagram that illustrates a computer system upon which an embodiment of the invention may be implemented.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general purpose microprocessor.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infra-red data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the worldwide packet data communication network now commonly referred to as the "Internet" 428. Local network 422 and Internet 428 both use electrical, electromagnetic, or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

Software Overview

Figure 5:
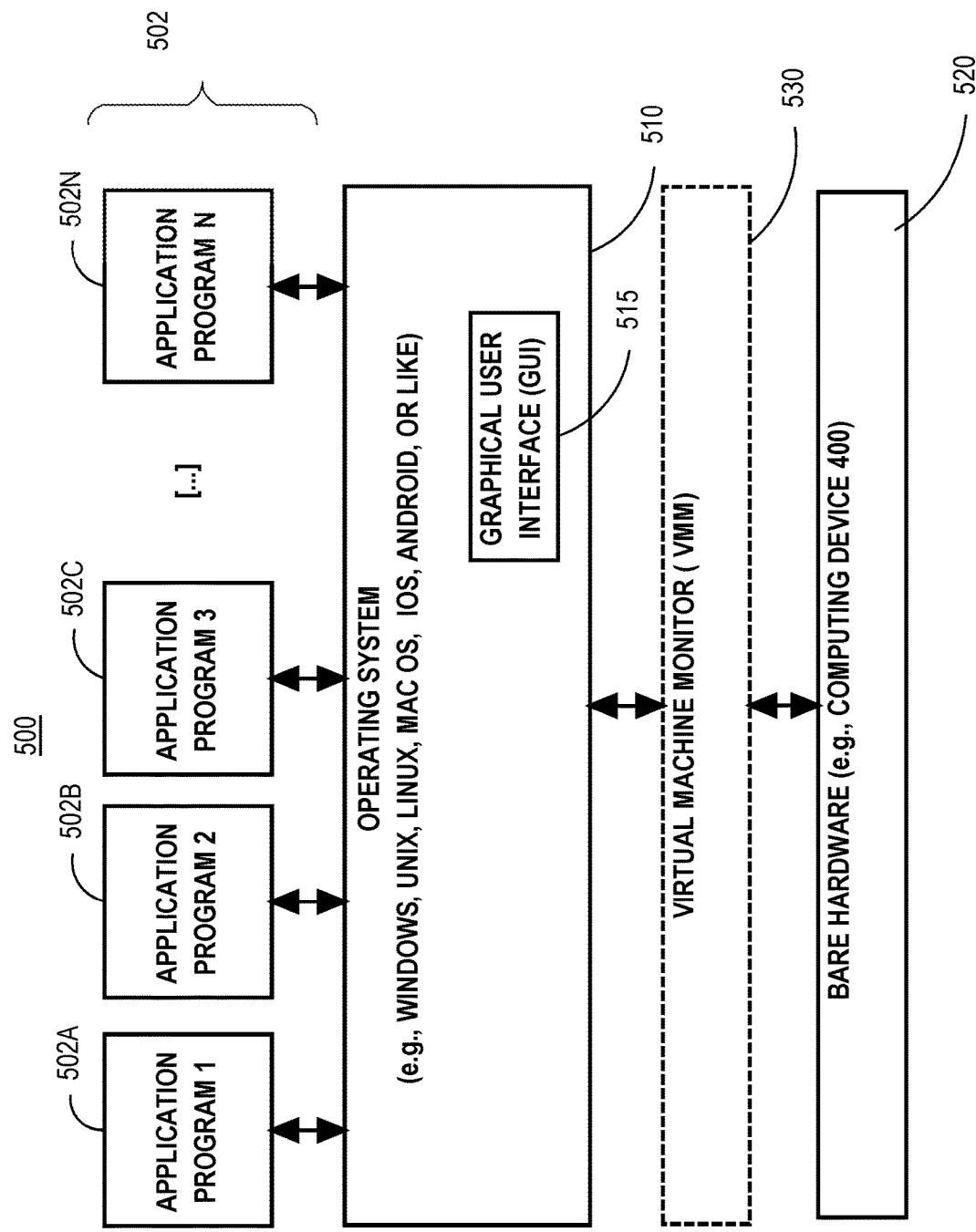
FIG. 5 is a block diagram of a basic software system that may be employed for controlling the operation of the computer system.

FIG. 5 is a block diagram of a basic software system 500 that may be employed for controlling the operation of computer system 400. Software system 500 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 500 is provided for directing the operation of computer system 400. Software system 500, which may be stored in system memory (RAM) 406 and on fixed storage (e.g., hard disk or flash memory) 410, includes a kernel or operating system (OS) 510.

The OS 510 manages low-level aspects of computer operation, including managing execution of processes, memory allocation, file input and output (I/O), and device I/O. One or more application programs, represented as 502A, 502B, 502C . . . 502N, may be "loaded" (e.g., transferred from fixed storage 410 into memory 406) for execution by the system 500. The applications or other software intended for use on computer system 400 may also be stored as a set of downloadable computer-executable instructions, for example, for downloading and installation from an Internet location (e.g., a Web server, an app store, or other online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 404) of computer system 400. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 400.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 400 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprises two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure, applications, and servers, including one or more database servers.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   in a first user database session, in response to receiving a first database statement:
      generating a first execution plan,
      while executing the first execution plan, recording first performance data that indicates one or more first performance metrics of executing the first execution plan for the first database statement;
      wherein the one or more first performance metrics pertain to one or more of Central Processing Unit time, elapsed time, buffer gets, disk reads, or temporary space usage;
   after recording the first performance data, receiving a second database statement, wherein the first execution plan can be used to generate a result for the second database statement;
   in a second user database session, in response to receiving the second database statement:
      generating a second execution plan,
      while executing the second execution plan, recording second performance data that indicates one or more second performance metrics of executing the second execution plan for the second database statement;
   performing a comparison between the first performance data and the second performance data;
   based on the comparison, determining whether to store the second execution plan for future use when processing the second database statement or another database statement for which the second execution plan can be used;
   wherein the method is performed by one or more computing devices.

2. The method of claim 1, further comprising:
   in response to receiving a third database statement, generating a third execution plan;
   determining whether the third execution plan matches an accepted plan for the third database statement;
   in response to determining that the third execution plan matches an accepted plan for the third database statement, classifying the third execution plan as not a test plan.

3. The method of claim 1, further comprising:
   in response to receiving a third database statement, generating a third execution plan;
   determining whether the third execution plan has already been verified in a foreground process;
   in response to determining that the third execution plan has already been verified in a foreground process, classifying the third execution plan as not a test plan.

4. The method of claim 1, further comprising:
   determining whether an execution plan that can be used to execute the second database statement and that is different than the second execution plan already exists in storage;
   if an execution plan that is different than the second execution plan already exists in the storage, then classifying the second execution plan as a test plan.

5. The method of claim 1, further comprising:
   determining, based on the comparison, that the first execution plan performed better than the second execution plan;
   in a third user database session, in response to receiving a third database statement:
      determining to execute the first execution plan,
      while executing the first execution plan, recording third performance data that indicates one or more third performance metrics of executing the first execution plan for the third database statement;
   performing a comparison between the second performance data and the third performance data.

6. The method of claim 5, further comprising:
   based on the comparison between the second performance data and the third performance data, determining that second performance data is better than the third performance data;
   in response to determining that second performance data is better than the third performance data, accepting the second execution plan.

7. The method of claim 5, further comprising:
   based on the comparison between the second performance data and the third performance data, determining that third performance data is better than the second performance data;
   in response to determining that third performance data is better than the second performance data, determining to not accept the second execution plan.

8. A method comprising:
   in a first user database session, in response to receiving a first database statement:
      generating a first execution plan,
      while executing the first execution plan, recording first performance data that indicates one or more first performance metrics of executing the first execution plan for the first database statement;
   after recording the first performance data, receiving a second database statement, wherein the first execution plan can be used to generate a result for the second database statement;
   in a second user database session, in response to receiving the second database statement:
      generating a second execution plan,
      while executing the second execution plan, recording second performance data that indicates one or more second performance metrics of executing the second execution plan for the second database statement;
   performing a comparison between the first performance data and the second performance data;
   based on the comparison, determining whether to store the second execution plan for future use when processing the second database statement or another database statement for which the second execution plan can be used;
   in response to receiving the second database statement:

determining a statement identifier for the second database statement;
based on the statement identifier, identifying a particular bit in a first bit vector;
determining whether the particular bit is set;
in response to determining that the particular bit is set, determining whether the second execution plan matches the first execution plan;
wherein the method is performed by one or more computing devices.

9. The method of claim 8, further comprising:
in response to receiving a third database statement, determining a second statement identifier for the third database statement;
based on the second statement identifier, identifying a second bit in the first bit vector;
determining whether the second bit is set;
in response to determining that the second bit is not set, determining a plan identifier for a third execution plan for the third database statement;
based on the second statement identifier and the plan identifier, identifying a third bit in a second bit vector that is different than the first bit vector;
determining whether the third bit is set.

10. The method of claim 9, further comprising:
in response to determining that the third bit is set, determining to execute the third execution plan without performing a verification operation.

11. The method of claim 9, further comprising:
in response to determining that the third bit is not set, determining to execute the third execution plan and perform a verification operation with respect to an execution of the third execution plan and another execution plan.

12. The method of claim 1, wherein performing the comparison is performed in the second user database session.

13. The method of claim 1, further comprising, in the second user database session:
determining that the second database statement matches the first database statement;
determining whether the second execution plan matches an execution plan that is associated with the first database statement;
in response to determining that the first execution plan is associated with the first database statement and that second execution plan does not match the first execution plan, determining to treat the second execution plan as a test plan and the first execution plan as a reference plan.

14. The method of claim 1, wherein performing the comparison comprises:
performing a set of checks to determine whether the first performance data is better than the second performance data;
performing the set of checks to determine whether the second performance data is better than the first performance data.

15. The method of claim 1, further comprising:
based on the comparison, invalidating a cursor for the second execution plan.

16. The method of claim 1, further comprising:
determining a resource limit for executing the second execution plan, wherein the resource limit is determined based on one or more performance metrics of executing the first execution plan.

17. One or more non-transitory storage media storing instructions which, when executed by one or more computing devices, cause:
in a first user database session, in response to receiving a first database statement:
generating a first execution plan,
while executing the first execution plan, recording first performance data that indicates one or more first performance metrics of executing the first execution plan for the first database statement;
wherein the one or more first performance metrics pertain to one or more of Central Processing Unit time, elapsed time, buffer gets, disk reads, or temporary space usage;
after recording the first performance data, receiving a second database statement, wherein the first execution plan can be used to generate a result for the second database statement;
in a second user database session, in response to receiving the second database statement:
generating a second execution plan,
while executing the second execution plan, recording second performance data that indicates one or more second performance metrics of executing the second execution plan for the second database statement;
performing a comparison between the first performance data and the second performance data;
based on the comparison, determining whether to store the second execution plan for future use when processing the second database statement or another database statement for which the second execution plan can be used.

18. The one or more non-transitory storage media of claim 17, wherein the instructions, when executed by the one or more computing devices, further cause:
in response to receiving a third database statement, generating a third execution plan;
determining whether the third execution plan matches an accepted plan for the third database statement;
in response to determining that the third execution plan matches an accepted plan for the third database statement, classifying the third execution plan as not a test plan.

19. The one or more non-transitory storage media of claim 17, wherein the instructions, when executed by the one or more computing devices, further cause:
in response to receiving a third database statement, generating a third execution plan;
determining whether the third execution plan has already been verified in a foreground process;
in response to determining that the third execution plan has already been verified in a foreground process, classifying the third execution plan as not a test plan.

20. The one or more non-transitory storage media of claim 17,
wherein the instructions, when executed by the one or more computing devices, further cause:
determining whether an execution plan that can be used to execute the second database statement and that is different than the second execution plan already exists in storage;
if an execution plan that is different than the second execution plan already exists in the storage, then classifying the second execution plan as a test plan.

* * * * *